Feb. 9, 1932.   L. LYNDON   1,844,432
MEANS AND METHOD FOR INDUCING ELECTRIC CURRENTS IN BODIES
Filed April 27, 1927   3 Sheets-Sheet 1
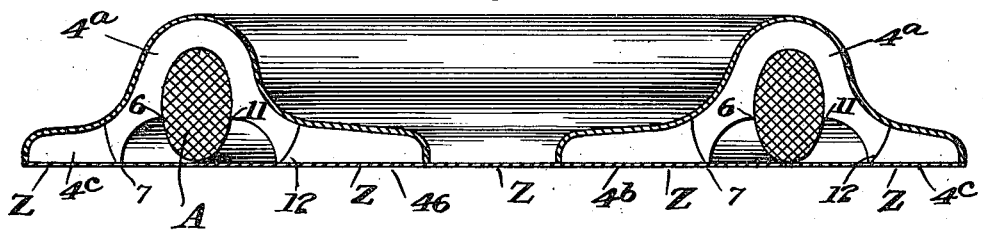
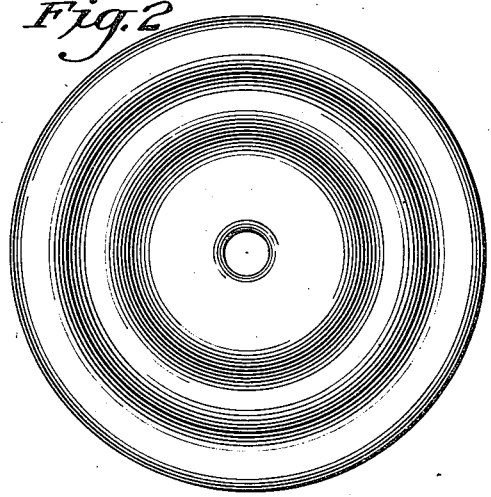
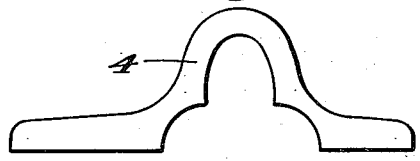
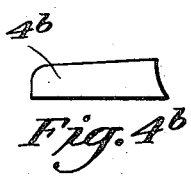
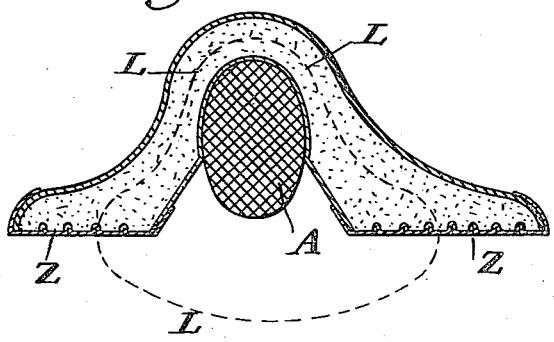
INVENTOR
Lamar Lyndon,
BY
Blakeslee+Brown
ATTORNEY Feb. 9, 1932.  L. LYNDON  1,844,432
MEANS AND METHOD FOR INDUCING ELECTRIC CURRENTS IN BODIES
Filed April 27, 1927   3 Sheets-Sheet 2
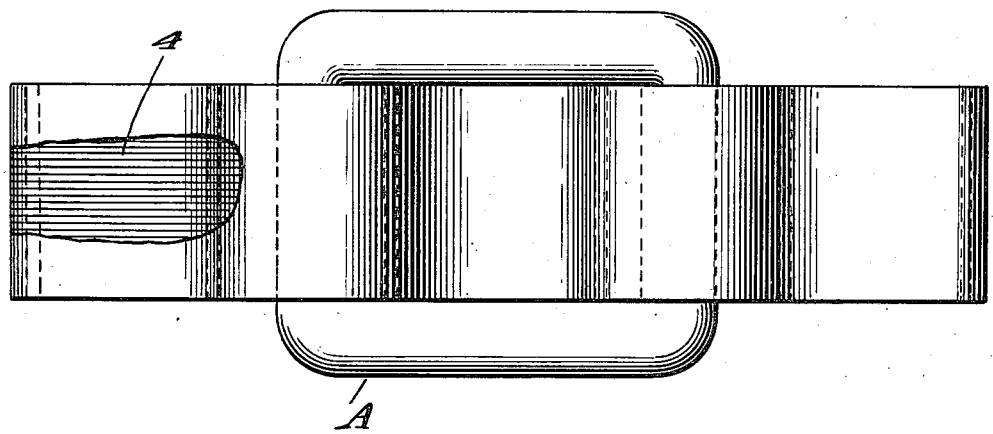
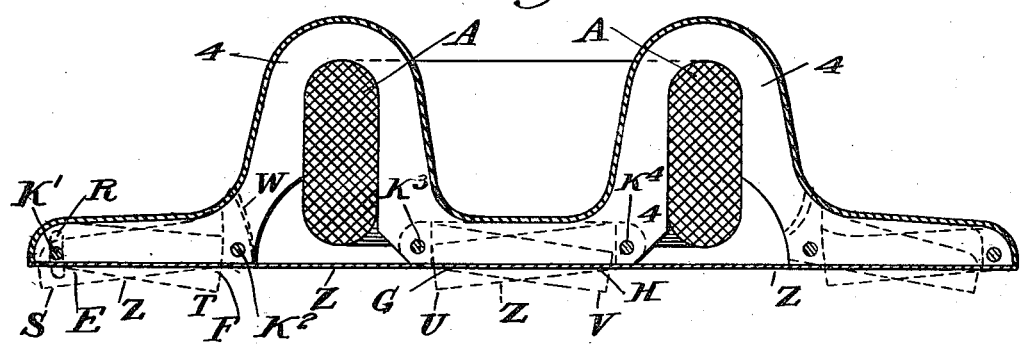
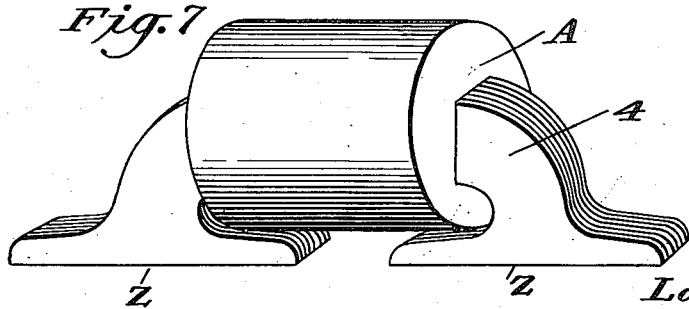
INVENTOR.
Lamar Lyndon,
BY
Blakesley+Brown
ATTORNEYS.

Feb. 9, 1932. L. LYNDON 1,844,432
MEANS AND METHOD FOR INDUCING ELECTRIC CURRENTS IN BODIES
Filed April 27, 1927 3 Sheets-Sheet 3
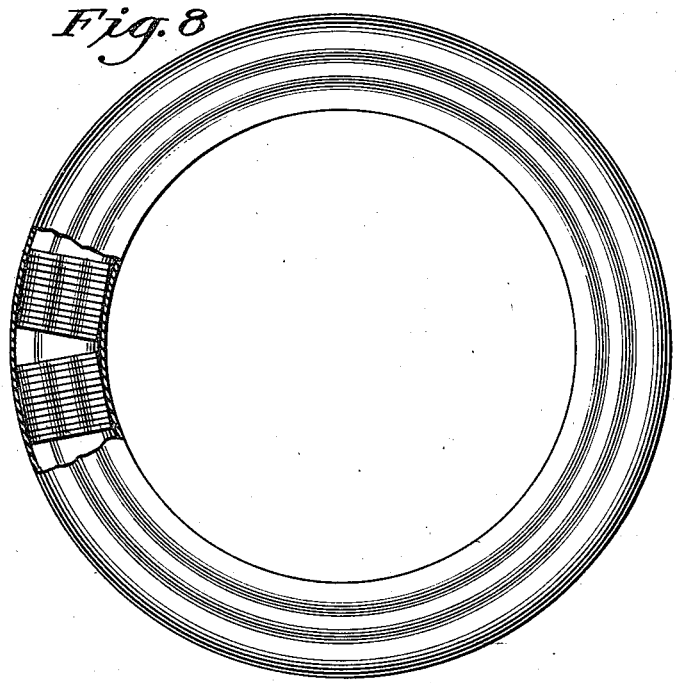
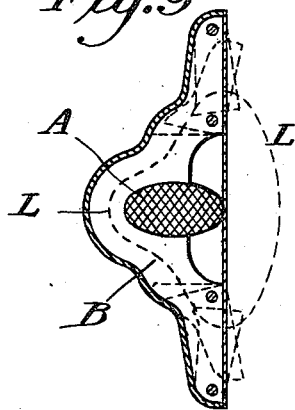
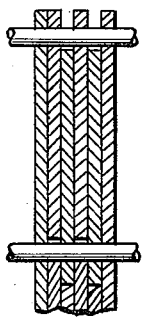
INVENTOR.
Lamar Lyndon,
BY
ATTORNEYS.

Patented Feb. 9, 1932

1,844,432

UNITED STATES PATENT OFFICE

LAMAR LYNDON, OF LOS ANGELES, CALIFORNIA

MEANS AND METHOD FOR INDUCING ELECTRIC CURRENTS IN BODIES

Application filed April 27, 1927. Serial No. 187,006.

This invention relates to that class of devices which are employed for the production of an alternating current flow in substances or masses of any kind, especially where it is desirable to dispense with electrodes, and avoid the electro-chemical effects which proceed from introducing current into substances or masses by using anodes and cathodes.

I have invented certain new and useful improvements in electrical appliances for inducing the flow of electrodeless alternating current in substances or bodies which permit the flow of current, and the electrical resistance whereof is not too great to admit of inducing an appreciable alternating current flow therein, with apparatus of moderate dimensions and cost.

The device has a number of possible uses, such as electrolyzing masses of liquids contained in non-metallic containers, electrolyzing organic substances of nearly every kind which contain both moisture and chemical salts, and other uses, some of which have not yet become generally known or used, but may appear later in the technical arts.

Briefly, the invention is a transformer, or rather the primary of a transformer, being a magnetic structure interlinked with an electric current coil, which structure is adapted to contact with or be adjacent to the body, or mass, to be electrolyzed.

The substance, or mass, comprises the secondary of the transformer, it constituting a single turn secondary, or to be brought in close proximity thereto.

If the mass to be electrolyzed is non-magnetic, the air-gap of the magnetic circuit is comparatively long, and extends from the limits of the magnetic structure on one side of the magnetizing coil, through the mass, or substance, to the other side of the coil. If the substance is magnetic, then the length of the air-gap is very small and limited to the contact surfaces between the terminating parts of the magnetic structure and the body with which it contacts. Obviously, if the apparatus be adapted for use with any sort of mass or body, whereof the configuration may be uneven and without smooth, plane surfaces whereon the magnetic structure may be applied, some provision is desirable to produce good contact between the magnetic structure and the mass or substance, to which it is applied. To meet this condition, I provide movable or flexible portions of the magnetic materials at the surfaces which are meant to cooperate, and make contact, with the substance or mass in which the current is to be induced, so that the movable portions of the structure may be made to conform to the configuration of the mass, or body, to which it may be applied.

In the drawings, Fig. 1 shows a cross section of one form of my apparatus, which, in this case, is circular in plan, Fig. 2 showing the device in plan, to a reduced scale.

Fig. 3 is a cross section of a portion of a form of magnetic structure which is made flexible by the use of finely divided iron instead of loosely held laminations.

Figs. 4, 4a, 4b and 4c show to a larger scale the different forms of laminations from which the magnetic circuit is constructed when one type of structure is used.

Fig. 5 is a plan of another form of the apparatus.

Fig. 6 is a cross section of the form of the apparatus shown in Fig. 5.

Fig. 7 shows still another form of the apparatus designed to induce two equal, simultaneous, oppositely-flowing alternating currents.

Fig. 8 is another form of apparatus, and

Fig. 9 is a detail of the laminations used therewith.

Fig. 10 is a partial sectional view of the laminations shown in Fig. 9.

In the figures, A is a coil of insulated wire adapted to receive electric current which traverses the coil. 4 is a stamping, or cutting, from a sheet of thin iron or steel which is given the form shown, so that it partly encircles the coil, (or in some cases, is encircled by the coil) as shown in Figure 7, and then spreads out into two opposite extensions or "feet". 4a is a similar lamination except that it has no end extensions, or "feet". (See Figs. 4a, 4b, and 4c).

4b and 4c are small, sheet-iron stampings which are loose and free to move in the same plane as that of their surfaces, but are practically restricted in any motion sidewise, or transverse to the plane of their surfaces. These form the side extensions or "feet" of the partial laminations $4a$ and when $4a$, $4b$ and $4c$ lie in the same plane, and the ends of $4a$ contact with the adjacent ends of $4b$ and $4c$ respectively, a complete lamination, similar to 4 is produced, except that the ends of the laminations 4 are integral and constitute a complete, unbroken sheet, while the ends of the laminations, made up with the separate pieces, are free to move, although the middle portion of the lamination remains fixed. These small end pieces normally are placed loosely, side by side within the radial spaces, or divisions, formed by the complete laminations and by the bottom, or inner cover, but within the limits of flexibility or extension of these covers, the loose pieces are free to move.

As indicated, the form of the laminations is such that the contacting portions, or the "feet", are cut away on the under side adjacent to the coil, thereby compelling the magnetic lines to travel some distance away from the coil surface before passing into the substance, or body, in which the current is to be induced. The object of this form is two-fold. One is to prevent the great amount of magnetic leakage which would take place around the lower surface of the coil without penetrating the body. The other object is to separate the two zones of entry of the magnetic field into the substance, so that the magnetic lines will be compelled to pass deeply into the substance, which effect is due to the fact that the lines of force will tend to follow a path which is the arc of a circle if they pass through a non-magnetic substance. Obviously, the further apart are the two poles of the magnetic structure, the deeper will the lines of force penetrate the substance.

The operation of this device is as follows:
The under surface Z, Z Fig. 1, is applied to the object in which it is desired to induce a flow of electrodeless, alternating current. Alternating current is supplied to the current coil A and flows therein. This current flow produces an alternating magnetic flux which passes around the upper portion of the coil and follows its surface until points 6 and 11 are reached. Since the laminations are cut away, to widen the bottom of the coil slot, so that the magnetic metal parts are widely separated at the plane of contact with the substance to be electrolyzed, the magnetic lines are constrained to follow the same path, and they, therefore, pass away from the coil and on down to the material, or body, which they enter through the "feet" on the two sides of the coil.

The feet of those laminations 4 which are complete undivided and integral units touch the mass, or substance, at one or two points, but no complete contact will be made unless the substance, or mass, is smooth and a plane surface. But the loose feet of the other laminations, which are free to move, will, individually, fall, or move, into contact with the body over most, or all, of their narrow surfaces, and where the aggregate number of the articulated laminations is very great, the effect is substantially the equivalent of a flexible, lower, contacting surface, which is able to touch practically all uneven surfaces to which it is applied. Another construction, whereby a close and efficient contact between the substance, or body, and the laminated surfaces of the magnetic circuit, is produced, is that in which the individual laminations in part, are articulated, as shown. Some of the laminations are without joints, being whole and integral, while others are cut into sections which are held in place by bolts, or rivets, K. In Fig. 6, the dotted lines S F; E T; U H; V G, and the like, indicate the articulated portions in their positions outward from the contact surface lines EF and GH.

Consider, for instance, the articulation of the left-hand portion. One lamination in the accompanying Figure 6, is articulated, while the next lamination, or the first one of the group, is whole and integral. The articulated lamination is cut at the left of the coil groove, along the curved dotted line W, while the next adjacent lamination is likewise cut along the same line or boundary. The small, cut-away portion at the left end of the lamination, is fastened in place by means of the bolt $K_1$, about which it is free to swing, or turn, so that it can assume the position E T, shown by the dotted lines between these indicators. Similarly, the next adjacent lamination, has a portion cut from its left-hand end, and this is pivoted about bolt $K_2$ so that it is free to turn about this bolt and assume the position shown by the dotted line S F. If the aforesaid pivoted pieces of the laminations are made so long that their ends extend beyond the opposite holding and pivoting bolts, slots must be cut in them, as at R, so that the bolt $K_1$ cannot obstruct the movement of the lamination portion pivoted at $K_2$, and bolt $K_2$ cannot prevent motion of the part pivoted at $K_1$. If the laminations are made shorter, so that the outwardly moving ends do not extend as far as the pivot bolts $K_1$, $K_2$, then the clearance slots are unnecessary.

Similarly, the laminations are shown cut along the dotted lines in the middle portion of the structure, and the small, cut-away parts are pivoted on bolts $K_3$ and $K_4$ as shown, so that they may assume the positions U H and G V indicated by the dotted lines. The right-hand portion is similar to the left-hand part previously described.

Obviously, by this construction, the articulated portions of the magnetic circuit may be severally adjusted to contact with the configuration of that portion of the mass, or body, to which the apparatus may be applied. Also, if the ampere-turns of the current through the winding A, be relatively great, it is clear that the articulated portions of the laminations will, automatically, move against the substance, or body, to which they may be applied; because the magnetic lines of force will produce a force which will tend to urge the loose parts of the magnetic circuit to move to such position as to diminish the reluctance of the magnetic path.

If it be desired to have the path of the current which is induced in the body, or material, spread over a wider zone than that equal to the width of the coil slots, this may be accomplished by cutting away parts of the magnetic structure adjacent to the coil slots, and widening them at the plane of contact as before explained. For example, if the laminations were all cut away along the path of the dotted lines 6, 7 and 11, 12, in Fig. 1, the width of the path of the current induced in the substance, would be equal to the distance from 7 to 12 for the left-hand portion of the apparatus, and similarly, corresponding cuttings along any part of the laminations on either side of the coil slot, widening at the plane of contact between apparatus and body would widen the zone traversed by the induced current. The closed dotted curves L L show the mean path of the magnetic flux through the apparatus and the contacting material, or substance Figs. 3 and 9. Of course there are many possible variants of this device, such as the use of metal filings, or otherwise finely divided iron or steel, such as steel wool and the like, employed to form the magnetic structure and the cooperating, flexible feet or contacting surfaces.

Also, the apparatus itself may be produced in many forms depending on the specific use to which it is to be put. For instance, Figs. 5 and 6 show a rectangularly shaped apparatus in which the magnetic field is applied to any substance, or body, only at two ends of the rectangular coil, while Figs. 8 and 9 show a circular coil with a series of magnetic structures, composed of radial groups of laminations projecting towards the center of the coil, and which are articulated to give flexible transfer contacting surfaces.

Of course, the flexible contacting surface may sometimes be unnecessary. If, for instance, an apparatus were used for electrolyzing liquids in containers having a fixed form, there would be no need for articulating laminations. However, as there are uses to which it may be, or become, adapted, which would require that the surfaces be flexible, a device for general use should be so constructed. The apparatus requires some form of covering. That which covers the upper portion may be of any suitable material, hard rubber, celluloid, leather, buckram or anything which will protect the edges of the laminations against bending or distortion.

The covering over the lower surface must be of some pliable or resilient material to allow the loose or articulated parts to move outwardly and position themselves to fit in hollows, or move inwardly to admit excrescences which form the configuration of the substance or body to which the apparatus may be applied.

In the description and claims the term "coil" means any form or shape of closed, current-carrying winding.

The term "resilient" is meant to express the ability of the contacting surface of magnetic metal to assume any configuration—within the limits of the specific design—to intimately contact with the surface of the substance or body to which the apparatus may be applied. Also, the terms "flexible", "articulated" and "resilient" are meant to comprehend and include "pliable", "unrestrained", "variable", "movable", as well as being themselves used interchangeably and as synonyms. This understanding allows reduction in the length of the specifications and number of claims.

It is, of course, understood that the coils, or windings, may have any preferred cross section. Although shown in the drawings as approximately circular or oval in section, they are in no wise limited to any such forms. In any case, the two opposite elements in planes normal to the coil axis are, obviously, the coil ends and the distance apart of these said elements measured axially, is the coil length. These conditions are necessarily employed in computing the coil inductance in accordance with the usual formulæ which include the radius and the coil length, measured axially, as factors. Also, the periphery of the coil may be given any desired configuration, the circular and rectangular forms shown in the drawings merely constituting preferred forms.

As an indication of the widely different forms which this device may be given, Fig. 7 is shown herewith. As indicated, A is the primary electric coil and B are the laminated pieces which, in this instance, are surrounded by the coil. The feet of the laminations are extended to cover a comparatively large area, as shown. Obviously, an alternating magnetic field will be directed into the substance or body, on which the feet are placed, responsive to a flow of alternating current in the coil A. This will, in turn, induce two separate alternating electric currents in the body, one surrounding each of the feet.

From this example it is obvious that numerous variants of the invention are possible, but every design which produces the result herein described by the application of an alternating magnetic field produced by an alternating electric current in a primary coil, which field is directed by means of an appropriate magnetic structure, is a mere variant of this invention.

I claim as my invention:

1. A device for inducing alternating electric currents in extraneous bodies, comprising a primary electrical coil, and discontinuous laminated magnetic structure associated with said coil, said magnetic structure being provided with articulated ends adaptable for movable engagement with said extraneous body.

2. In combination, an electric current coil and a magnetic structure interlinked with said coil, said magnetic structure being formed with an air gap portion, and movable extensions carried by said magnetic structure in the zone of said air gap portion.

3. In a device for inducing current flow in various substances to which it may be applied, a magnetic structure provided with terminating poles between which a magnetic field may be produced; an electric current coil interlinked therewith and adapted to set up a magnetic field between the said poles when current flows in said coil, and pole ends formed of small subdivided parts of magnetic metal in movable contact with, and carried by, and forming a portion of the said magnetic structure.

4. In combination, an electric current coil; a magnetic structure associated with the coil to be magnetized thereby when current flows through the coil, the structure having an air gap at least as wide as the diameter of the coil section, the ends of the structure being movable and lying in a substantially common plane and extended to provide a greater area of contact surface at each end of the structure than the area of the cross section of the said structure at any part of its length.

5. A device for producing an alternating magnetic flux in any extraneous fortuitous conducting body or material, including a laminated structure of magnetic metal having an air gap, the metal at the ends of said gap being formed to a substantially uniplanar surface projecting from one side of the device and so positioned that said ends are adapted to be applied to an extraneous surface; an exciting means for said structure comprising a continuous winding adapted to receive pulsating current and so associated with the said structure that pulsating current flow through the coil produces an alternating magnetic field across the air gap, the form and position of said poles and gap directing a portion of said magnetic field through a zone of any extraneous conducting body to which they may be applied.

6. An apparatus for inducing alternating electric currents in extraneous, fortuitous conducting bodies and materials including a closed winding for electric current; a magnetic structure having an air gap and associated with the said winding so that current flow therethrough sets up a magnetic field across said gap, the said structure being adapted to direct the said magnetic field to selected locations on extraneous bodies to which it may be applied, said structure being built up of thin laminæ of magnetic metal so that it can follow the pulsating changes in magnetization in degree and phase.

7. A device for passing alternating electric current through fortuitous, conducting substances extraneous to and independent of said device, including a metallic magnetic structure having an air gap and poles; a winding adapted to receive alternating electric currents and so associated with said structure that alternating current flow in the winding induces a magnetic field between the poles, the metal on each side of the air gap being extended radially of and away from the winding, thereby providing an area of contact of the metal ends with any contacting surface exceeding that of the cross section of the metal at any part thereof, the said structure being made of laminæ of magnetic metal so that it is enabled to follow the pulsating magneto-motive forces set up by the pulsating current and keep in phase therewith.

8. An electro-magnetic induction system for static induction of alternating currents in fortuitous media, comprising an electrical coil for reception of pulsating current; a magnetic structure having an air gap a portion whereof turns partly around said coil, the structure being formed of metal laminæ whereof the ends are extended oppositely to each other, and normal to said coil, the said extended parts projecting away from the structure and coil and lying in a substantially common plane, said ends being shaped and positioned to contact with an extraneous surface so that an alternating magnetic flux is passed through that part of any substance lying between the said poles when pulsating current is supplied to the said coil.

9. An electro-magnetic apparatus composed of an electrical winding; a magnetic structure of thin metal sheets formed with a channel for reception of the winding and also providing an air gap in the structure, the width whereof is at least as great as the greatest thickness of the winding.

10. An electro-magnetic apparatus composed of an electrical winding; a magnetic structure of thin metal sheets formed with a channel for reception of the winding and also providing an air gap in the structure, the width whereof is at least as great as the greatest thickness of the winding, extensions at the ends of said structure adapted to contact with a substantially common plane, the area of contact of each extension exceeding the sectional area of the structure through the channeled portion thereof.

11. A device for inducing an alternating magnetic flux in extraneous fortuitous substances independent of the said device comprising a laminated magnetic structure having poles and an air gap; an electrical winding for excitation of said structure, the poles being adapted for contacting with a body external to, and disassociated from, said device so that the flux between the pole ends passes in part through any body to which said pole ends may be applied, the entirety being so formed that the magnetic flux density through said fortuitous body will vary with its magnetic characteristics and its electrical conductivity.

12. An electro-magnetic device for inducing alternating current flow in fortuitous substances and bodies extraneous to and independent of said device, comprising a magnetic structure; an exciting coil therefor, said structure comprising a plurality of laminations each whereof partially surrounds the coil and has two ends spaced apart, both being formed to contact with a fortuitous extraneous body, said ends of the laminations being separated a distance greater than the maximum diameter of the cross section of said coil.

13. In an alternating current induction apparatus, the combination of a closed winding adapted to receive a pulsating electric current, a group of laminations interlinked therewith, said laminations being of magnetic metal and having a forked shape, formed to partially encircle the winding and having two projecting branches which diverge from tangential points of contact with the winding, said branches terminating in a substantially common plane.

14. In an alternating current induction apparatus, the combination of a magnetic structure having an air gap; an electric current coil for excitation of the structure, said structure being composed of assembled small pieces of magnetic metal so shaped as to partially encircle the said coil and having projections on each side thereof forming divergent branches, said branches terminating in feet, the lower ends whereof lie in a substantially common plane.

15. In an induction device for inducing alternating currents in extraneous bodies and materials, independent of said device, the combination of a magnetic structure built up of small pieces of magnetic metal whereof one dimension is less than 0.30 inch; a continuous electrical winding adapted to receive pulsating current for magnetizing the structure, said structure partly encircling said winding and having diverging branches tangential to the winding on each side thereof, said branches terminating in feet which lie in a substantially common plane with an air gap therebetween and across which an alternating magnetic flux is propagated when pulsating current is supplied to the said electrical current winding, a portion of said flux penetrating any extraneous substance to which the device may be applied.

16. In an induction device having an electric current coil and a magnetic structure, a lamination formed to partly encircle the coil and having branches extending on both sides of and tangential to the coil, said branches terminating in spatially related poles between which is an air gap, the width of said gap increasing with increase in axial approach to the ends of the structure, said ends being formed to a substantially uniplanar surface.

17. An inductor for producing flow of alternating current in fortuitous and extraneous bodies and media comprising an electric winding adapted to receive alternating current from any convenient source, whereof the radius exceeds the axial length; a laminated magnetic structure concentric and co-extensive with said winding surrounding one end thereof.

18. An inductor for producing flow of alternating current in fortuitous and extraneous bodies and media comprising an electric winding adapted to receive alternating current from any convenient source, whereof the radius exceeds the axial length; a laminated magnetic structure concentric and coextensive with said winding, encircling one end of the winding and having a gap at the other end of the winding.

19. An inductor for producing flow of alternating current in fortuitous and extraneous bodies and media comprising an electric winding adapted to receive alternating current from any convenient source, whereof the radius exceeds the axial length; a laminated magnetic structure concentric and co-extensive with said winding, encircling one end of the winding, and having a gap at the other end of the winding, said gap width exceeding the radial thickness of the winding.

20. An inductor for producing flow of alternating current in fortuitous and extraneous bodies and media comprising an electric winding adapted to receive alternating current from any convenient source, whereof the radius exceeds the axial length; a laminated magnetic structure concentric and co-extensive with said winding encircling one end of the winding, and having a gap at the other end of the winding, said structure having extensions projecting from each side of said gap substantially normal to the winding.

21. An inductor for producing flow of alternating current in fortuitous and extraneous bodies and media comprising an electric winding adapted to receive alternating current from any convenient source, whereof the radius exceeds the axial length;

a laminated magnetic structure concentric and co-extensive with said winding, encircling one end of the winding, and having a gap at the other end of the winding, said structure having extensions projecting from each side of said gap substantially normal to the winding, terminal edges of said projections being in a substantially common plane.

In testimony whereof, I have signed my name to this specification.

LAMAR LYNDON.